(12) United States Patent
Yanagisawa et al.

(10) Patent No.: US 12,021,240 B2
(45) Date of Patent: Jun. 25, 2024

(54) BATTERY

(71) Applicant: AESC Japan Ltd., Kanagawa (JP)

(72) Inventors: Ryota Yanagisawa, Kanagawa (JP); Yoshimasa Yamamoto, Kanagawa (JP)

(73) Assignee: AESC Japan Ltd., Kanagawa (JP)

( * ) Notice: Subject to any disclaimer, the term of this patent is extended or adjusted under 35 U.S.C. 154(b) by 457 days.

(21) Appl. No.: 17/435,308

(22) PCT Filed: Mar. 5, 2020

(86) PCT No.: PCT/JP2020/009335
§ 371 (c)(1),
(2) Date: Aug. 31, 2021

(87) PCT Pub. No.: WO2020/184360
PCT Pub. Date: Sep. 17, 2020

(65) Prior Publication Data
US 2022/0158191 A1 May 19, 2022

(30) Foreign Application Priority Data
Mar. 8, 2019 (JP) .................................. 2019-042200

(51) Int. Cl.
*H01M 4/62* (2006.01)
*H01M 4/133* (2010.01)
(Continued)

(52) U.S. Cl.
CPC ........... *H01M 4/622* (2013.01); *H01M 4/133* (2013.01); *H01M 10/0525* (2013.01);
(Continued)

(58) Field of Classification Search
CPC .. H01M 4/133; H01M 4/622; H01M 10/0525; H01M 10/0567; H01M 50/449;
(Continued)

(56) References Cited

U.S. PATENT DOCUMENTS

2010/0159318 A1  6/2010  Sato et al.
2010/0216028 A1  8/2010  Sato et al.
(Continued)

FOREIGN PATENT DOCUMENTS

JP  2008-307893 A  12/2008
JP  2008-311221 A  12/2008
(Continued)

OTHER PUBLICATIONS

International Search Report issued in PCT/JP2020/009335; mailed Jun. 2, 2020.

*Primary Examiner* — Adam A Arciero
(74) *Attorney, Agent, or Firm* — Studebaker & Brackett PC (57) ABSTRACT

A battery (10) includes a positive electrode (100) and a first insulating layer (322). The positive electrode (100) includes a current collector (110) and a first active material layer (122). The current collector (110) includes a first surface (112) and a second surface (114). The second surface (114) is opposite to the first surface (112). The first active material layer (122) is positioned over the first surface (112) of the current collector (110). The first insulating layer (322) faces the first active material layer (122) of the positive electrode (100). The first active material layer (122) contains at least one carbon. The first insulating layer (322) contains magnesium hydroxide particles. A product of an area density and a specific surface area of the magnesium hydroxide particles is equal to or greater than 0.20 times a sum of products of an area density and a specific surface area of each of the at least one carbon.

5 Claims, 3 Drawing Sheets

(51) Int. Cl.
    *H01M 10/0525*  (2010.01)
    *H01M 10/0567*  (2010.01)
    *H01M 50/409*   (2021.01)
    *H01M 50/443*   (2021.01)
    *H01M 50/449*   (2021.01)
    *H01M 50/489*   (2021.01)

(52) U.S. Cl.
    CPC ..... *H01M 10/0567* (2013.01); *H01M 50/449* (2021.01); *H01M 50/409* (2021.01); *H01M 50/443* (2021.01); *H01M 50/489* (2021.01)

(58) Field of Classification Search
    CPC ............. H01M 50/409; H01M 50/443; H01M 50/489; H01M 50/457; H01M 50/46
    See application file for complete search history.

(56) References Cited

U.S. PATENT DOCUMENTS

| | | | | |
|---|---|---|---|---|
| 2014/0287295 | A1* | 9/2014 | Honda | ................ B32B 5/022 |
| | | | | 429/144 |
| 2015/0311493 | A1* | 10/2015 | Abe | ................ H01M 50/426 |
| | | | | 429/7 |

FOREIGN PATENT DOCUMENTS

| | | |
|---|---|---|
| JP | 2009-231281 A | 10/2009 |
| JP | 2010-160939 A | 7/2010 |
| JP | 2010-165664 A | 7/2010 |

\* cited by examiner

BATTERY

TECHNICAL FIELD

The invention relates to a battery.

BACKGROUND ART

Secondary batteries, particularly non-aqueous electrolyte secondary batteries are developed as one of the battery. The non-aqueous electrolyte secondary battery includes a positive electrode, a negative electrode, and a separator. The separator is positioned between the positive electrode and the negative electrode.

Patent Document 1 discloses an example of the separator. The separator includes a polyethylene microporous membrane and a heat-resistant porous layer on both surfaces of the polyethylene microporous membrane. The heat-resistant porous layer includes an inorganic filler formed of polymetaphenylene isophthalamide and aluminum hydroxide.

Patent Document 2 discloses another example of the separator. The separator includes a polyethylene microporous membrane and a porous layer on both surfaces of the polyethylene microporous membrane. The porous layer includes an inorganic filler formed of meta-type wholly aromatic polyamide and $\alpha$-alumina.

Patent Document 3 and 4 discloses still another example of the separator. The separator includes a polyethylene porous film and a heat-resistant porous layer on the polyethylene porous film. The heat-resistant porous layer includes liquid crystal polyester and alumina particles.

Patent Document 5 discloses improvement of resistance of a battery in a crushing test. In Patent Document 5, a tensile elongation percentage of a positive electrode, a tensile elongation percentage of a negative electrode, and a tensile elongation percentage of a separator are specified, in order to improve the resistance in the crushing test.

RELATED DOCUMENT

Patent Document

[Patent Document 1] Japanese Unexamined Patent Publication No. 2009-231281
[Patent Document 2] Japanese Unexamined Patent Publication No. 2010-160939
[Patent Document 3] Japanese Unexamined Patent Publication No. 2008-311221
[Patent Document 4] Japanese Unexamined Patent Publication No. 2008-307893
[Patent Document 5] Japanese Unexamined Patent Publication No. 2010-165664

SUMMARY OF THE INVENTION

Technical Problem

In a non-aqueous electrolyte secondary battery, particularly a lithium ion battery, gas (for example, carbon dioxide gas generated by oxidative decomposition of carbonic acid ester in an electrolyte) may be generated during charging and discharging. The residual gas in a cell may cause various troubles (for example, an increase in distance between a positive electrode and a negative electrode adjacent to each other or an increase in internal pressure of the cell).

An example of an object of the invention is to reduce residual gas in a cell. Another object of the invention will be clearly shown from the disclosure of the specification.

Solution to Problem

In one aspect of the present invention, there is provided a battery including:
a positive electrode including a current collector including a first surface and a second surface opposite to the first surface, and a first active material layer positioned over the first surface of the current collector; and
a first insulating layer facing the first active material layer of the positive electrode,
in which the first active material layer contains at least one carbon,
the first insulating layer contains magnesium hydroxide particles, and
a product of an area density and a specific surface area of the magnesium hydroxide particles is equal to or greater than 0.20 times a sum of products of an area density and a specific surface area of each of the at least one carbon.

Advantageous Effects of Invention

According to the one aspect of the present invention, the residual gas in the cell can be reduced.

DESCRIPTION OF EMBODIMENTS

Hereinafter, an embodiment of the invention will be described with reference to the drawings. In all of the drawings, the same reference numerals are used for the same constituent elements and the description will not be repeated.

Figure 1:
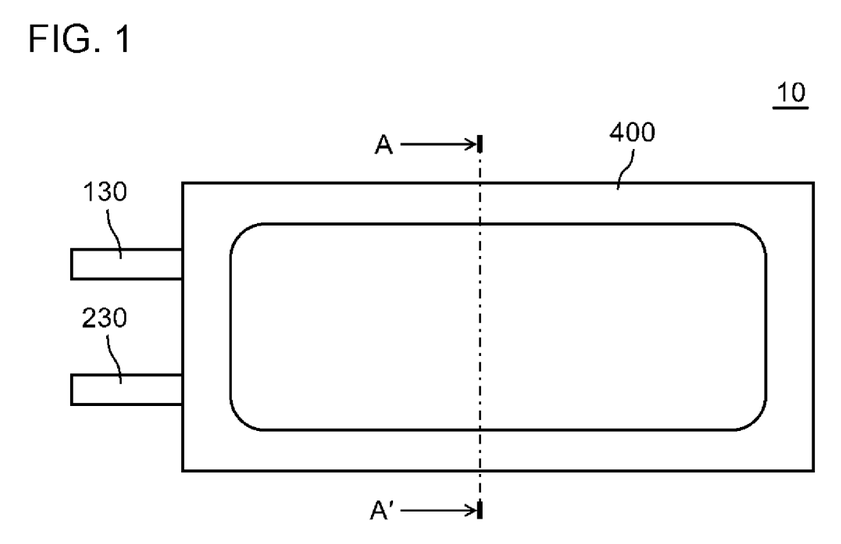
FIG. 1 is a top view of a battery according to an embodiment.
Figure 2:
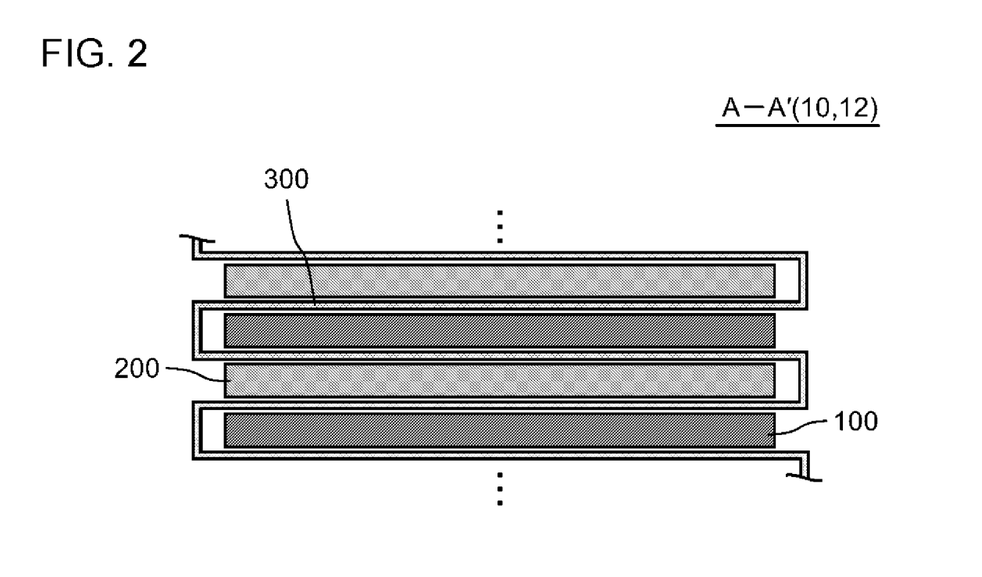
FIG. 2 is a A-A' sectional view of FIG. 1.
Figure 3:
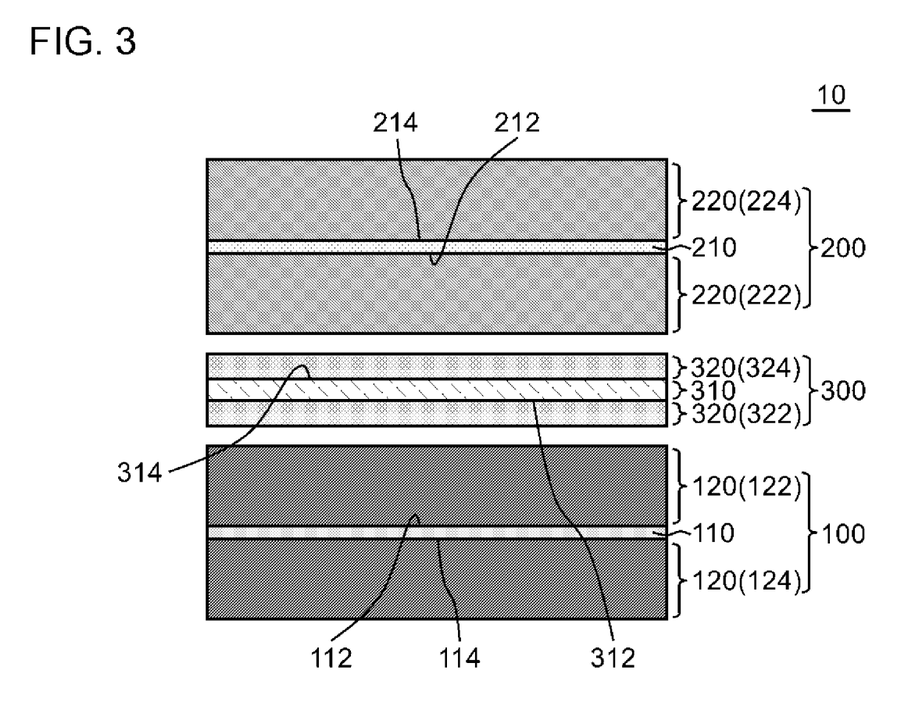
FIG. 3 is an enlarged view of one part of FIG. 2.

FIG. 1 is a top view of a battery 10 according to the embodiment. FIG. 2 is an A-A' sectional view of FIG. 1. FIG. 3 is an enlarged view of one part of FIG. 2. FIG. 2 does not show an exterior material 400 shown in FIG. 1, for the description.

The outline of the battery 10 will be described with reference to FIG. 3. The battery 10 includes a positive electrode 100 and a first insulating layer 322. The positive electrode 100 includes a current collector 110 and a first active material layer 122. The current collector 110 includes a first surface 112 and a second surface 114. The second surface 114 is opposite to the first surface 112. The first active material layer 122 is positioned over the first surface 112 of the current collector 110. The first insulating layer 322 faces the first active material layer 122 of the positive electrode 100. The first active material layer 122 contains at least one carbon. The first insulating layer 322 contains magnesium hydroxide particles. A product of an area density and a specific surface area of the magnesium hydroxide particles is equal to or greater than 0.20 times a sum of products of an area density and a specific surface area of each of the at least one carbon. In a case where the first active material layer 122 contains only one carbon, the sum of the products of the area density and the specific surface area of each of the at least one carbon means the product of the area density and the specific surface area of the carbon.

According to the embodiment, the residual gas in the cell (in a space closed by an exterior material 400 which will be described later) can be reduced. Specifically, the inventors have newly focused on a relationship between the product of the area density and the specific surface area of magnesium hydroxide particles and the product of the area density and the specific surface area of each of carbon, in order to reduce the residual gas in the cell. The inventors have conducted studies and found that the residual gas in the cell is reduced according to the relationship between the product of magnesium hydroxide and the sum of the products of each of carbon, as will be described in detail later.

The details of the battery 10 will be described with reference to FIG. 1.

The battery 10 includes a first lead 130, a second lead 230, and an exterior material 400.

The first lead 130 is electrically connected to the positive electrode 100 shown in FIG. 2. The first lead 130 may be formed of, for example, aluminum or an aluminum alloy.

The second lead 230 is electrically connected to the negative electrode 200 shown in FIG. 2. The second lead 230 may be formed of, for example, copper, a copper alloy, or nickel-plated article thereof.

In the example shown in FIG. 1, the exterior material 400 has a rectangular shape having four sides. In the example shown in FIG. 1, the first lead 130 and the second lead 230 are protruded from one common side of the four sides of the exterior material 400. In another example, the first lead 130 and the second lead 230 may be protruded from different sides (for example, sides opposite to each other) of the four sides of the exterior material 400.

The exterior material 400 accommodates a laminate 12 shown in FIG. 2, together with an electrolyte (not shown).

The exterior material 400, for example, includes a thermally fusible resin layer and a barrier layer, and may be, for example, a laminate film including a thermally fusible resin layer and a barrier layer.

A resin material forming the thermally fusible resin layer may be, for example, polyethylene (PE), polypropylene, nylon, polyethylene terephthalate (PET), or the like. A thickness of the thermally fusible resin layer is, for example, equal to or greater than 20 μm and equal to or smaller than 200 μm, preferably equal to or greater than 30 μm and equal to or smaller than 150 μm, and more preferably equal to or greater than 50 μm and equal to or smaller than 100 μm.

The barrier layer, for example, has barrier properties for preventing leakage of the electrolyte or penetration of moisture from the outside, and may be, for example, a barrier layer formed of metal such as stainless steel (SUS) foil, aluminum foil, aluminum alloy foil, copper foil, or titanium foil. A thickness of the barrier layer is, for example, equal to or greater than 10 μm and equal to or smaller than 100 μm, preferably equal to or greater than 20 μm and equal to or smaller than 80 μm, and more preferably equal to or greater than 30 μm and equal to or smaller than 50 μm.

The thermally fusible resin layer of the laminate film may be one layer or two or more layers. In the same manner, the barrier layer of the laminate film may be one layer or two or more layers.

The electrolyte is, for example, a non-aqueous electrolyte. This non-aqueous electrolyte may include a lithium salt and a solvent for dissolving lithium salt.

Examples of the lithium salt may include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiC_4F_9SO_3$, $Li(CF_3SO_2)_2N$, lower fatty acid lithium carboxylate, and the like.

The solvent for dissolving a lithium salt may include carbonic acid ester, such as carbonates such as ethylene carbonate (EC), propylene carbonate (PC), butylene carbonate (BC), dimethyl carbonate (DMC), ethyl methyl carbonate (EMC), diethyl carbonate (DEC), methyl ethyl carbonate (MEC), and vinylene carbonate (VC). The solvent may further include lactones such as γ-butyrolactone and γ-valerolactone; ethers such as trimethoxymethane, 1,2-dimethoxyethane, diethyl ether, tetrahydrofuran, and 2-methyltetrahydrofuran; sulfoxides such as dimethyl sulfoxide; dioxolanes such as 1,3-dioxolane and 4-methyl-1,3-dioxolane; a nitrogen-containing solvent such as acetonitrile, nitromethane, formamide, and dimethylformamide; organic acid esters such as methyl formate, methyl acetate, ethyl acetate, butyl acetate, methyl propionate, and ethyl propionate; phosphate triesters and diglymes; triglymes; sulfolanes such as sulfolane and methyl sulfolane; oxazolidinones such as 3-methyl-2-oxazolidinone; and sultones such as 1,3-propane sultone, 1,4-butane sultone, and naphtha sultone; or the like. These substances may be used alone or in combination thereof.

The carbonic acid ester in the solvent may be oxidatively decomposed by charging and discharging in the vicinity of the positive electrode 100 to generate carbon dioxide gas. The residual carbon dioxide gas in the cell may cause various troubles (for example, an increase in distance between the positive electrode 100 and the negative electrode 200 or an increase in internal pressure (pressure in a space closed by the exterior material 400) of the cell). In the embodiment, such troubles can be reduced.

The electrolyte may further include an additive. The additive may be, for example, a sulfonic acid ester such as a cyclic sulfonic acid ester.

The details of the laminate 12 will be described with reference to FIG. 2.

The laminate 12 includes the plurality of positive electrodes 100, the plurality of negative electrodes 200, and the separator 300. The plurality of positive electrodes 100 and the plurality of negative electrodes 200 are alternately laminated on each other. In the example shown in FIG. 2, the separator 300 is folded in zigzags so that a part of the separator 300 is positioned between the positive electrode 100 and the negative electrode 200 adjacent to each other. In another example, the plurality of separators 300 spaced apart from each other may be positioned between positive electrode 100 and the negative electrode 200 adjacent to each other.

The details of each of the positive electrode 100, the negative electrode 200, and the separator 300 will be described with reference to FIG. 3.

The positive electrode 100 includes the current collector 110 and the active material layers 120 (the first active material layer 122 and the second active material layer 124). The current collector 110 includes a first surface 112 and a second surface 114. The second surface 114 is opposite to the first surface 112. The first active material layer 122 is over the first surface 112 of the current collector 110. The second active material layer 124 is over the second surface 114 of the current collector 110.

The current collector 110 may be formed of, for example, aluminum, stainless steel, nickel, titanium, or an alloy thereof. A shape of the current collector 110 may be, for example, a foil, a flat plate, or a mesh.

The active material layers 120 (the first active material layer 122 and the second active material layer 124) include an active material, a binder resin, and a conductive assist.

The active material contained in the active material layer 120 (the first active material layer 122 and the second active material layer 124) is, for example, represented by $Li_aNi_bM_{1-b}O_2$ (M is one or more kinds of element selected from Co, Mn, Al, Ti, Zr, Na, Ba, and Mg). $Li_aNi_bM_{1-b}O_2$ is, for example, lithium-nickel composite oxide;
lithium-nickel-A1 composite oxide (A1 is one of cobalt, manganese, aluminum, titanium, zirconium, sodium, barium, and magnesium);
lithium-nickel-B1-B2 composite oxide (each of B1 and B2 is one of cobalt, manganese, aluminum, titanium, zirconium, sodium, barium, and magnesium. B1 and B2 are different from each other);
lithium-nickel-C1-C2-C3 composite oxide (each of C1 to C3 is one of cobalt, manganese, aluminum, titanium, zirconium, sodium, barium, and magnesium. C1 to C3 are different from each other);
lithium-nickel-D1-D2-D3-D4 composite oxide (each of D1 to D4 is one of cobalt, manganese, aluminum, titanium, zirconium, sodium, barium, and magnesium. D1 to D4 are different from each other);
lithium-nickel-E1-E2-E3-E4-E5 composite oxide (each of E1 to E5 is one of cobalt, manganese, aluminum, titanium, zirconium, sodium, barium, and magnesium. E1 to E5 are different from each other);
lithium-nickel-F1-F2-F3-F4-F5-F6 composite oxide (each of F1 to F6 is one of cobalt, manganese, aluminum, titanium, zirconium, sodium, barium, and magnesium. F1 to F6 are different from each other);
lithium-nickel-G1-G2-G3-G4-G5-G6-G7 composite oxide (each of G1 to G7 is one of cobalt, manganese, aluminum, titanium, zirconium, sodium, barium, and magnesium. G1 to G7 are different from each other); or
lithium-nickel-cobalt-manganese-aluminum-titanium-zirconium-sodium-barium-magnesium composite oxide.

A composition ratio a of $Li_aNi_bM_{1-b}O_2$ is, for example, $0.95 \leq a \leq 1.05$. A composition ratio b of $Li_aNi_bM_{1-b}O_2$ may be, for example, suitably determined depending on an energy density of the battery 10. The energy density of the battery 10 increases, as the composition ratio b is great. The composition ratio b is, for example, $b \geq 0.50$ and preferably $b \geq 0.80$. In other examples, the active material included in the active material layers 120 (the first active material layer 122 and the second active material layer 124) may be composite oxide of lithium and transition metal such as lithium-cobalt composite oxide or lithium-manganese composite oxide; a transition metal sulfide such as $TiS_2$, FeS, or $MoS_2$; transition metal oxide such as MnO, $V_2O_5$, $V_6O_{13}$, or $TiO_2$; or olivine type lithium phosphorus oxide. The olivine type lithium phosphorus oxide includes, for example, at least one of element of the group consisting of Mn, Cr, Co, Cu, Ni, V, Mo, Ti, Zn, Al, Ga, Mg, B, Nb, and Fe, lithium, phosphorus, and oxygen. In these compounds, some elements may be partially substituted with other elements, in order to improve properties thereof. These substances may be used alone or in combination thereof.

A density of the active material included in the active material layers 120 (the first active material layer 122 and the second active material layer 124) is, for example, equal to or greater than 2.0 g/cm³ and equal to or smaller than 4.0 g/cm³, preferably equal to or greater than 2.4 g/cm³ and equal to or smaller than 3.8 g/cm³, and more preferably equal to or greater than 2.8 g/cm³ and equal to or smaller than 3.6 g/cm³.

The active material included in the active material layer 120 (the first active material layer 122 and the second active material layer 124) may have, for example, a specific surface area equal to or greater than 0.25 m²/g and equal to or smaller than 1.45 m²/g.

A thickness of the active material layer (the first active material layer 122 or the second active material layer 124) over one surface of both surfaces (the first surface 112 and the second surface 114) of the current collector 110 may be, for example, suitably determined depending on a rate of the battery 10. The rate of the battery 10 increases, as the thickness is thin. The thickness is, for example, equal to or smaller than 60 μm, preferably equal to or smaller than 50 μm, and more preferably equal to or smaller than 40 μm.

A total thickness of the active material layers (the first active material layer 122 and the second active material layer 124) over both surfaces (the first surface 112 and the second surface 114) of the current collector 110 may be, for example, suitably determined depending on a rate of the battery 10. The rate of the battery 10 increases, as the thickness is thin. The thickness is, for example, equal to or smaller than 120 μm, preferably equal to or smaller than 100 μm, and more preferably equal to or smaller than 80 μm.

The active material layers 120 (the first active material layer 122 and the second active material layer 124) can be, for example, manufactured as follows. First, an active material, a binder resin, and a conductive assist are dispersed in an organic solvent to prepare a slurry. The organic solvent is, for example, N-methyl-2-pyrrolidone (NMP). Next, this slurry is applied over the first surface 112 of the current collector 110, the slurry is dried, the pressing is performed, if necessary, and the active material layer 120 (the first active material layer 122) is formed over the current collector 110. The second active material layer 124 can also be formed in the same manner.

A binder resin included in the active material layers 120 (the first active material layer 122 and the second active material layer 124) is, for example, polytetrafluoroethylene (PTFE) or polyvinylidene fluoride (PVDF).

The amount of the binder resin included in the active material layer 120 (the first active material layer 122 or the second active material layer 124) may be suitably determined. The amount of binder resin included in the first active material layer 122 is, for example, equal to or greater than 0.1 parts by mass and equal to or smaller than 10.0 parts by mass, preferably equal to or greater than 0.5 parts by mass and equal to or smaller than 5.0 parts by mass, and more preferably equal to or greater than 2.0 parts by mass and equal to or smaller than 4.0 parts by mass, with respect to 100 parts by mass of a total mass of the first active material layer 122. The same applies to the second active material layer 124.

The conductive assist included in the active material layer 120 (the first active material layer 122 and the second active material layer 124) is carbon. The conductive assist contains at least one carbon. Carbon has a different specific surface area depending on the species. The carbon is, for example, carbon black, ketjen black, acetylene black, natural graphite, artificial graphite, carbon nanotube, carbon nanohorn, carbon fibers such as carbon nanobrush, or the like. Carbon may be, for example, flake graphite or spherical graphite. These substances may be used alone or in combination thereof.

The amount of conductive assist included in the active material layer 120 (the first active material layer 122 or the second active material layer 124) may be, for example, suitably determined depending on cycling properties of the battery 10. The cycling properties of the battery 10 are improved, as the amount of conductive assist of the active material layer 120 is great. The amount of conductive assist included in the first active material layer 122 is, for example, equal to or greater than 3.0 parts by mass and equal to or smaller than 8.0 parts by mass and preferably equal to or greater than 5.0 parts by mass and equal to or smaller than 6.0 parts by mass, with respect to 100 parts by mass of a total mass of the active material layer 120. The same applies to the second active material layer 124.

The negative electrode 200 includes the current collector 210 and active material layer 220 (the first active material layer 222 and the second active material layer 224). The current collector 210 includes the first surface 212 and the second surface 214. The second surface 214 is opposite to the first surface 212. The first active material layer 222 is over the first surface 212 of the current collector 210. The second active material layer 224 is over the second surface 214 of the current collector 210.

The current collector 210 may be formed of, for example, copper, stainless steel, nickel, titanium, or an alloy thereof. A shape of the current collector 210 may be, for example, a foil, a flat plate, or a mesh.

The active material layers 220 (the first active material layer 222 and the second active material layer 224) include an active material and a binder resin. The active material layers 220 may further include a conductive assist, if necessary.

Examples of the active material included in the active material layers 220 (the first active material layer 222 and the second active material layer 224) include a carbon material such as graphite storing lithium, amorphous carbon, diamond-like carbon, fullerene, carbon nanotube, or carbon nanohorn; a lithium-based metal material such as lithium metal or lithium alloy, an Si-based material such as Si, $SiO_2$, $SiO_x$ (0<x≤2), an Si-containing composite material; a conductive polymer material such as polyacene, polyacetylene or polypyrrole, and the like. These substances may be used alone or in combination thereof. In one example, the active material layers 220 (the first active material layer 222 and the second active material layer 224) may include a first group of graphite particles (for example, natural graphite) having a first average particle diameter and a first average hardness, and a second group of graphite particles (for example, natural graphite) having a second average particle diameter and a second average hardness. The second average particle diameter may be smaller than the first average particle diameter, the second average hardness may be higher than the first average hardness, a total mass of the second group of graphite particles may be smaller than a total mass of the first group of graphite particles, and the total mass of the second group of graphite particles may be, for example, equal to or greater than 20 parts by mass and equal to or smaller than 30 parts by mass with respect to 100 parts by mass of the total mass of the first group of graphite particles.

A density of the active material included in the active material layers 220 (the first active material layer 222 and the second active material layer 224) is, for example, equal to or greater than 1.2 $g/cm^3$ and equal to or smaller than 2.0 $g/cm^3$, preferably equal to or greater than 1.3 $g/cm^3$ and equal to or smaller than 1.9 $g/cm^3$, and more preferably equal to or greater than 1.4 $g/cm^3$ and equal to or smaller than 1.8 $g/cm^3$.

A thickness of the active material layer (the first active material layer 222 or the second active material layer 224) over one surface of both surfaces (the first surface 212 and the second surface 214) of the current collector 210 may be, for example, suitably determined depending on a rate of the battery 10. The rate of the battery 10 increases, as the thickness is thin. The thickness is, for example, equal to or smaller than 60 μm, preferably equal to or smaller than 55 μm, and more preferably equal to or smaller than 50 μm.

A total thickness of the active material layers (the first active material layer 222 and the second active material layer 224) over both surfaces (the first surface 212 and the second surface 214) of the current collector 210 may be, for example, suitably determined depending on a rate of the battery 10. The rate of the battery 10 increases, as the thickness is thin. The thickness is, for example, equal to or smaller than 120 μm, preferably equal to or smaller than 110 μm, and more preferably equal to or smaller than 100 μm.

The active material layers 220 (the first active material layer 222 and the second active material layer 224) can be, for example, manufactured as follows. First, an active material and a binder resin are dispersed in a solvent to prepare a slurry. The solvent may be, for example, an organic solvent such as N-methyl-2-pyrrolidone (NMP) or water. Next, this slurry is applied over the first surface 212 of the current collector 210, the slurry is dried, the pressing is performed, if necessary, and the active material layer 220 (the first active material layer 222) is formed over the current collector 210. The second active material layer 224 can also be formed in the same manner.

A binder resin included in the active material layers 220 (the first active material layer 222 and the second active material layer 224) may be, for example, a binder resin such as polyvinylidene fluoride (PVDF), in a case of using an organic solvent as the solvent for obtaining the slurry, and may be, for example, a rubber-based binder (for example, styrene-butadiene rubber (SBR)) or an acryl-based binder resin, in a case of using water as the solvent for obtaining the slurry. Such a water-based binder resin may be an emulsion form. In a case of using water as the solvent, the water-based binder and a thickener such as carboxymethyl cellulose (CMC) is preferably used in combination.

The amount of the binder resin included in the active material layer 220 (the first active material layer 222 or the second active material layer 224) may be suitably determined. The amount of binder resin included in the first active material layer 222 is, for example, equal to or greater than 0.1 parts by mass and equal to or smaller than 10.0 parts by mass, preferably equal to or greater than 0.5 parts by mass and equal to or smaller than 8.0 parts by mass, more preferably equal to or greater than 1.0 part by mass and equal to or smaller than 5.0 parts by mass, and even more preferably equal to or greater than 1.0 part by mass and equal to or smaller than 3.0 parts by mass with respect to 100 parts by mass of a total mass of the first active material layer 222. The same applies to the second active material layer 224.

The separator 300 includes a base material 310 and insulating layers 320 (a first insulating layer 322 and a second insulating layer 324). The base material 310 includes a first surface 312 and a second surface 314. The second surface 314 is opposite to the first surface 312. The first insulating layer 322 is over the first surface 312 of the base material 310. The second insulating layer 324 is over the second surface 314 of the base material 310.

In the example shown in FIG. 3, the separator 300 includes the insulating layers 320 (the first insulating layer 322 and the second insulating layer 324) over both surfaces (the first surface 312 and the second surface 314) of the base material 310. In another example, the separator 300 may include the insulating layer 320 only over one surface of both surfaces (the first surface 312 and the second surface 314) of the base material 310.

The separator 300 has a function of electrically insulating the positive electrode 100 and the negative electrode 200 from each other, and transmitting ions (for example, lithium ions). The separator 300 may be, for example, a porous separator.

The shape of the separator 300 may be suitably determined in accordance with the shape of the positive electrode 100 or the negative electrode 200, and may be, for example, a rectangular shape.

The base material 310 preferably includes a resin layer including a heat-resistant resin. The resin layer includes the heat-resistant resin as a main component, and specifically, the amount of the heat-resistant resin is equal to or greater than 50 parts by mass, preferably equal to or greater than 70 parts by mass, and more preferably equal to or greater than 90 parts by mass with respect to 100 parts by mass of a total mass of the resin layer, and the amount of the heat-resistant resin may be 100 parts by mass with respect to 100 parts by mass of the total mass of the resin layer. The resin layer may be a single layer or may be a layer of two or more kinds thereof.

The heat-resistant resin is, for example, one kind or two or more kinds selected from polyethylene, polyethylene terephthalate, polybutylene terephthalate, polyethylene naphthalate, poly-m-phenylene terephthalate, poly-p-phenylene isophthalate, polycarbonate, polyester carbonate, aliphatic polyamide, wholly aromatic polyamide, semi-aromatic polyamide, wholly aromatic polyester, polyphenylene sulfide, polyparaphenylene benzobisoxazole, polyimide, polyarylate, polyetherimide, polyamideimide, polyacetal, polyetheretherketone, polysulfone, polyethersulfone, fluororesin, polyethernitrile, modified polyphenylene ether, and the like.

The insulating layers 320 (the first insulating layer 322 and the second insulating layer 324) can be, for example, manufactured as follows. First, magnesium hydroxide particles and a resin are dispersed in a solvent to prepare a solution. Examples of the solvent include water, alcohols such as ethanol, N-methylpyrrolidone (NMP), toluene, dimethyl carbonate (DMC), ethyl methyl carbonate (EMC), and the like. Next, the solution is applied over the first surface 312 of the base material 310 to form the insulating layer 320 (the first insulating layer 322). The second insulating layer 324 can also be formed in the same manner.

The magnesium hydroxide particles may have, for example, a specific surface area equal to or greater than 6.1 $m^2/g$ and equal to or smaller than 8.0 $m^2/g$.

In a case where the electrolyte contains sulfonic acid ester, the sulfonic acid ester may contain equal to or greater than 5.0 parts by mass of a sulfonic acid group with respect to 100 parts by mass of the total mass of the magnesium hydroxide particles. The sulfonic acid ester is easily adsorbed on the magnesium hydroxide particles. Therefore, it is preferable that a ratio of the mass of the sulfonic acid ester to the mass of the magnesium hydroxide particles is comparatively great.

Examples of the resin included in the insulating layers 320 (the first insulating layer 322 and the second insulating layer 324) include aromatic polyamide-based resin such as meta-based aromatic polyamide or para-based aromatic polyamide; a cellulose-based resin such as carboxymethyl cellulose (CMC); an acryl-based resin; a fluororesin such as polyvinylidene fluoride (PVDF); and the like. Among these, an aromatic polyamide-based resin is preferable, and a meta-based aromatic polyamide is more preferable. These substances may be used alone or in combination thereof.

A thickness of the base material 310 may be suitably determined, and may be, for example, equal to or greater than 5.0 μm and equal to or smaller than 10.0 μm, and preferably equal to or greater than 6.0 μm and equal to or smaller than 10.0 μm.

A total of the thickness of the first insulating layer 322 and the thickness of the second insulating layer 324 may be suitably determined, and may be, for example, equal to or greater than 10.0 μm and equal to or smaller than 20.0 μm and preferably equal to or greater than 12.5 μm and equal to or smaller than 17.5 μm.

A thickness of the separator 300 may be suitably determined, and may be, for example, equal to or greater than 15.0 μm and equal to or smaller than 30.0 μm and preferably equal to or greater than 16.0 μm and equal to or smaller than 27.5 μm.

In the example shown in FIG. 3, the positive electrode 100, the negative electrode 200, and the separator 300 are overlapped with each other so that the first surface 112 of the positive electrode 100 faces the first surface 312 of the separator 300 and the first surface 212 of the negative electrode 200 faces the second surface 314 of the separator 300.

EXAMPLES

Table 1 shows conditions of a positive electrode 100 in each of Examples 1 to 7 and Comparative Examples 1 to 7. In Table 1, "first carbon" to "fourth carbon" are as follows.

First carbon: spherical graphite (manufactured by Timical Co., Ltd.: C65, specific surface area $s1_m$: 65.0 $m^2/g$)

Second carbon: spherical graphite (manufactured by Timical Co., Ltd.: C45, specific surface area $s2_m$: 18.5 $m^2/g$)

Third carbon: flake graphite (manufactured by Timical Co., Ltd.: KS6L, specific surface area $s3_m$: 45.0 $m^2/g$)

Fourth carbon: carbon nanotube (specific surface area $s4_m$: 300.0 $m^2/g$)

Table 2 shows conditions of the positive electrode 100, conditions of the separator 300, and reduction of residual gas in each of Examples 1 to 7 and Comparative Examples 1 to 7.

Example 1

The battery 10 was manufactured as follows.

The positive electrode 100 was formed as follows. First, the following materials were dispersed in an organic solvent to prepare a slurry.

Active material: 94.0 parts by mass of lithium nickel-containing composite oxide (chemical formula: $Li_{1.01}(Ni_{0.80}Co_{0.15}Al_{0.05})O_2$)

Conductive assist: 2.0 parts by mass of first carbon (area density a1: 2.5 $g/m^2$) and 1.0 part by mass of the second carbon (area density a2: 1.2 $g/m^2$)

Binder Resin: 3.0 Parts by Mass of Polyvinylidene Fluoride (PVDF)

Next, this slurry was applied over both surfaces (the first surface 112 and the second surface 114) of an aluminum foil (current collector 110), the slurry was dried, the pressing was performed, and the active material layers 120 (the first active material layer 122 and the second active material layer 124) were formed. Details of the current collector 110, the first active material layer 122, and the second active material layer 124 are as follows.

(Current Collector 110)
Thickness: 15 μm
(First Active Material Layer 122)
Density: 3.35 g/cm³
Thickness: 36.6 μm
(Second Active Material Layer 124)
Density is 3.35 g/cm³
Thickness: 36.6 μm The negative electrode 200 was formed as follows. First, the following materials were dispersed in water to prepare a slurry.

Active material: 77.36 parts by mass of natural graphite (average particle diameter: 16.0 μm) and 19.34 parts by mass of natural graphite (average particle diameter: 10.5 μm)

Conductive assist: 0.3 parts by mass of spherical graphite.
Binder Resin: 2.0 Parts by Mass of Styrene-Butadiene Rubber (SBR)
Thickener: 1.0 part by mass of carboxymethyl cellulose (CMC) Next, this slurry was applied over both surfaces (the first surface 212 and the second surface 214) of a copper foil (current collector 210), the slurry was dried, the pressing was performed, and the active material layers 220 (the first active material layer 222 and the second active material layer 224) were formed. Details of the current collector 210, the first active material layer 222, and the second active material layer 224 are as follows.

(Current Collector 210)
Thickness: 8 μm
(First Active Material Layer 222)
Density: 1.55 g/cm³
Thickness: 50.0 μm
(Second Active Material Layer 224)
Density: 1.55 g/cm³
Thickness: 50.0 μm The separator 300 was formed as follows. First, the following materials were dispersed in a solvent to prepare a solution.

Inorganic filler: 75 parts by mass of magnesium hydroxide particles
Resin: 25 parts by mass of meta-based aromatic polyamide Next, this solution was applied over both surfaces (the first surface 312 and the second surface 314) of a polyethylene film (base material 310) to form the insulating layers 320 (the first insulating layer 322 and the second insulating layer 324). Details of the base material 310, the first insulating layer 322, and the second insulating layer 324 are as follows.

(Base Material 310)
Thickness: 6.0 μm
(First Insulating Layer 322)
Thickness: 8.0 μm
Area density A2 of magnesium hydroxide particles: 6.4 g/m²
Specific surface area $S2_m$ of magnesium hydroxide particles: 6.1 m²/g
(Second Insulating Layer 324)
Thickness: 8.0 μm
Area density A2 of magnesium hydroxide particles: 6.4 g/m²
Specific surface area $S2_m$ of magnesium hydroxide particles: 6.1 m²/g As shown in FIG. 2, the laminate 12 was formed so that 14 positive electrodes 100 and 14 negative electrodes 200 were alternately arranged and the separator 300 was folded in zigzags.

As shown in FIG. 1, the battery 10 was manufactured by accommodating the laminate 12 in exterior material 400 together with an electrolyte. The electrolyte contains the following supporting electrolyte, a solvent, and an additive.

Supporting electrolyte: $LiPF_6$
Solvent: 30% by volume ethylene carbonate (EC), 60% by volume diethyl carbonate (DEC), and 10% by volume methyl ethyl carbonate (MEC).
Additive: Cyclic sulfonic acid ester (Cyclic sulfonic acid ester contains 0.27 parts by mass of a sulfonic acid group with respect to 100 parts by mass of a total mass of the active material particles of the first active material layer 122 or the second active material layer 124), 1.5 parts by mass of vinylene carbonate with respect to 100 parts by mass of a total mass of the electrolyte, and 1.0 part by mass of fluoroethylene carbonate with respect to 100 parts by mass of a total mass of the electrolyte The reduction of residual gas was evaluated for the battery 10. Specifically, initial charging was performed at a temperature of 25° C. with a charge rate of 0.15 C, an end-of-charge voltage of 4.2 V, and a constant current of 2.3 A. A volume $V_0$ (cc) of the battery 10 before the initial charge and a volume $V_{charge}$ (cc) of the battery 10 after the initial charge were measured. The reduction of residual gas was evaluated based on the following criteria.

A: $V_{charge}/V_0 \times 100$ was less than 115%.
B: $V_{charge}/V_0 \times 100$ was equal to or more than 115%.

Examples 2 to 7 and Comparative Examples 1 to 7

The conditions of the positive electrode 100 and the conditions of the separator 300 in each of Examples 2 to 7 and Comparative Examples 1 to 7 are the same as the conditions of the positive electrode 100 and the conditions of the separator 300 in Example 1, except for the points shown in Tables 1 and 2. The residual gas in each of Examples 2 to 7 and Comparative Examples 1 to 7 was as shown in Table 2. In each of Examples 2 to 7 and Comparative Examples 1 to 7, the parts by mass of the conductive assist of the first active material layer 122 of the positive electrode 100 and the parts by mass of the binder resin are adjusted so that the total mass of the first active material layer 122 is 100 parts by mass and the parts by mass of the active material of the first active material layer 122 is 94.0 parts by mass.

The same applies to the second active material layer 124. In Table 2, "-" in Comparative Example 7 means that the first insulating layer 322 and the second insulating layer 324 do not contain magnesium hydroxide particles.

From the comparison of the results of Examples 1 to 7 and the results of Comparative Examples 1 to 7, a product P2 of the area density A2 and the specific surface area $S2_m$ of the magnesium hydroxide particles may be equal to or greater than 0.20 times a sum P1 of a product p1 of the area density a1 and the specific surface area $s1_m$ of the first carbon, a sum p2 of the area density a2 and the specific surface area $s2_m$ of the second carbon, a product p3 of the area density a3 of the specific surface area $s3_m$ of the third carbon, and a product p4 of the area density a4 and the specific surface area $s4_m$ of the fourth carbon (a numerical value (0.20) is rounded to two significant figures). The residual gas in the cell can be reduced according to the relationship between the sum P1 and the product P2.

The reason why the residual gas is reduced by the relationship between the sum P1 and the product P2 is assumed to be as follows. It is assumed that a lot of the gas generated by the initial charge is carbon dioxide gas generated by the oxidative decomposition of the carbonic acid ester contained in the electrolyte. The sum P1 corresponds to a total surface area of carbon per unit area, and the product P2 corresponds to a total surface area of magnesium hydroxide particles per unit area. As the sum P1 is great, a surface area of a chemical reaction that generates carbon dioxide (that is, the total surface area of carbon) increases and the generation of amount of carbon dioxide can be increased. Meanwhile, as the product P2 is great, a surface area of a chemical reaction that absorbs carbon dioxide (that is, the total surface area of magnesium hydroxide particles) increases and the absorption of amount of carbon dioxide can be increased. In each of Examples 1 to 7, the surface area of the chemical reaction that absorbs carbon dioxide (that is, the product P2) has a comparatively greater ratio with respect to the surface area of the chemical reaction that generates carbon dioxide (that is, the sum P1), thereby reducing residual carbon dioxide.

From the result of Examples 1 to 7, a ratio of the thickness of the first insulating layer 322 to the thickness of the base material 310 or a ratio of thickness of the second insulating layer 324 to the thickness of the base material 310 may be equal to or greater than 3.0/4.0 and equal to or smaller than 4.0/3.0. The residual gas is reduced without depending on the relationship between the thickness of the base material 310 and the thickness of the first insulating layer 322 or the relationship between the thickness of the base material 310 and the thickness of the second insulating layer 324, at least in the ranges described above.

TABLE 1

| | Positive electrode | | | | | | | | | | | | | | | |
|---|---|---|---|---|---|---|---|---|---|---|---|---|---|---|---|---|
| | First carbon | | | | Second carbon | | | | Third carbon | | | | Fourth carbon | | | |
| | Ratio (parts by mass) | Area density $a1$ (g/m$^2$) | Specific surface area $s1_m$ (m$^2$/g) | $p1 = a1 * s1_m$ | Ratio (parts by mass) | Area density $a2$ (g/m$^2$) | Specific surface area $s2_m$ (m$^2$/g) | $p2 = a2 * s2_m$ | Ratio (parts by mass) | Area density $a3$ (g/m$^2$) | Specific surface area $s3_m$ (m$^2$/g) | $p3 = a3 * s3_m$ | Ratio (parts by mass) | Area density $a4$ (g/m$^2$) | Specific surface area $a4_m$ (m$^2$/g) | $p4 = a4 * s4_m$ |
| Example 1 | 2.0 | 2.5 | 65.0 | 159.4 | 1.0 | 1.2 | 18.5 | 22.7 | — | — | — | — | — | — | — | — |
| Example 2 | 2.0 | 2.5 | 65.0 | 159.4 | 1.0 | 1.2 | 18.5 | 22.7 | — | — | — | — | — | — | — | — |
| Example 3 | — | — | — | — | — | — | — | — | 5.0 | 4.8 | 45.0 | 217.1 | — | — | — | — |
| Example 4 | — | — | — | — | 1.0 | 1.2 | 18.5 | 22.7 | 3.0 | 3.7 | 45.0 | 165.5 | — | — | — | — |
| Example 5 | 5.0 | 3.8 | 65.0 | 248.6 | — | — | — | — | — | — | — | — | — | — | — | — |
| Example 6 | — | — | — | — | — | — | — | — | — | — | — | — | 0.5 | 0.6 | 300.0 | 183.9 |
| Example 7 | — | — | — | — | — | — | — | — | — | — | — | — | 0.5 | 0.6 | 300.0 | 183.9 |
| Comparative Example 1 | 2.0 | 2.5 | 65.0 | 159.4 | 1.0 | 1.2 | 18.5 | 22.7 | — | — | — | — | — | — | — | — |
| Comparative Example 2 | 3.0 | 3.7 | 65.0 | 239.1 | 1.0 | 1.2 | 18.5 | 22.7 | — | — | — | — | — | — | — | — |
| Comparative Example 3 | 5.0 | 4.8 | 65.0 | 313.6 | — | — | — | — | — | — | — | — | — | — | — | — |
| Comparative Example 4 | — | — | — | — | — | — | — | — | 5.0 | 4.8 | 45.0 | 217.1 | — | — | — | — |
| Comparative Example 5 | 5.0 | 3.8 | 65.0 | 248.6 | — | — | — | — | — | — | — | — | — | — | — | — |
| Comparative Example 6 | — | — | — | — | — | — | — | — | — | — | — | — | 0.5 | 0.6 | 300.0 | 183.9 |
| Comparative Example 7 | 2.0 | 2.5 | 65.0 | 159.4 | 1.0 | 1.2 | 18.5 | 22.7 | — | — | — | — | — | — | — | — |

TABLE 2

| | Positive electrode | | | Separator | | | | | | |
|---|---|---|---|---|---|---|---|---|---|---|
| | Density of active material layer (g/cm$^3$) | Thickness of active material layer (μm) | $P1 = p1 + p2 + p3 + p4$ | Area density $A2$ (g/m$^2$) | Specific surface area $S2_m$ (m$^2$/g) | $P2 = A2 * S2_m$ | Thickness of base material (μm) | Thickness of insulating layer (μm) | P2/P1 | Reduction of residual gas |
| Example 1 | 3.35 | 36.6 | 182.1 | 6.4 | 6.1 | 38.8 | 6.0 | 8.0 | 0.21 | A |
| Example 2 | 3.35 | 36.6 | 182.1 | 4.8 | 8.0 | 38.2 | 9.0 | 6.0 | 0.21 | A |
| Example 3 | 2.92 | 33.0 | 217.1 | 6.4 | 8.0 | 50.9 | 6.0 | 8.0 | 0.23 | A |
| Example 4 | 3.35 | 36.6 | 188.2 | 4.8 | 8.0 | 38.2 | 9.0 | 6.0 | 0.20 | A |

TABLE 2-continued

| | Positive electrode | | | Separator | | | | | | |
|---|---|---|---|---|---|---|---|---|---|---|
| | Density of active material layer (g/cm³) | Thickness of active material layer (µm) | P1 = p1 + p2 + p3 + p4 | Area density A2 (g/m²) | Specific surface area S2$_m$ (m²/g) | P2 = A2 * S2$_m$ | Thickness of base material (µm) | Thickness of insulating layer (µm) | P2/P1 | Reduction of residual gas |
| Example 5 | 2.80 | 27.3 | 248.6 | 6.4 | 8.0 | 50.9 | 6.0 | 8.0 | 0.20 | A |
| Example 6 | 3.35 | 36.6 | 183.9 | 4.8 | 8.0 | 38.2 | 9.0 | 6.0 | 0.21 | A |
| Example 7 | 3.35 | 36.6 | 183.9 | 6.4 | 8.0 | 50.9 | 9.0 | 8.0 | 0.28 | A |
| Comparative Example 1 | 3.35 | 36.6 | 182.1 | 4.8 | 6.1 | 29.1 | 9.0 | 6.0 | 0.16 | B |
| Comparative Example 2 | 3.35 | 36.6 | 261.8 | 4.8 | 8.0 | 38.2 | 9.0 | 6.0 | 0.15 | B |
| Comparative Example 3 | 2.92 | 33.0 | 313.6 | 6.4 | 8.0 | 50.9 | 6.0 | 8.0 | 0.16 | B |
| Comparative Example 4 | 2.92 | 33.0 | 217.1 | 4.8 | 8.0 | 38.2 | 9.0 | 6.0 | 0.18 | B |
| Comparative Example 5 | 2.80 | 27.3 | 248.6 | 6.4 | 6.1 | 38.8 | 6.0 | 8.0 | 0.16 | B |
| Comparative Example 6 | 3.35 | 36.6 | 183.9 | 4.8 | 6.1 | 29.1 | 9.0 | 6.0 | 0.16 | B |
| Comparative Example 7 | 3.35 | 36.6 | 182.1 | — | — | — | 9.0 | 6.0 | — | B |

Hereinabove, the embodiments and the examples of the invention have been described with reference to the drawings, but these are merely examples of the invention, and various other configurations may also be used.

This application claims priority based on Japanese Patent Application No. 2019-042200 filed on Mar. 8, 2019, the entire disclosure of which is incorporated herein.

REFERENCE SIGNS LIST

10: battery
12: laminate
100: positive electrode
110: current collector
112: first surface
114: second surface
120: active material layer
122: first active material layer
124: second active material layer
130: first lead
200: negative electrode
210: current collector
212: first surface
214: second surface
220: active material layer
222: first active material layer
224: second active material layer
230: second lead
300: separator
310: base material
312: first surface
314: second surface
320: insulating layer
322: first insulating layer
324: second insulating layer
400: exterior material

The invention claimed is:

1. A battery comprising:
a positive electrode comprising a current collector comprising a first surface and a second surface opposite to the first surface, and a first active material layer positioned over the first surface of the current collector; and
a first insulating layer facing the first active material layer of the positive electrode,
wherein the first active material layer comprises at least one carbon,
the first insulating layer comprises magnesium hydroxide particles, and
a product of an area density and a specific surface area of the magnesium hydroxide particles is equal to or greater than 0.20 times a sum of products of an area density and a specific surface area of each of the at least one carbon.

2. The battery according to claim 1, further comprising:
a separator facing the positive electrode; and
a negative electrode facing the separator from a side opposite to the positive electrode,
wherein the separator comprises the first insulating layer, a second insulating layer facing the negative electrode, and a base material positioned between the first insulating layer and the second insulating layer.

3. The battery according to claim 1,
wherein the magnesium hydroxide particles have a specific surface area equal to or greater than 6.1 m²/g and equal to or smaller than 8.0 m²/g.

4. The battery according to claim 1, further comprising:
an electrolyte comprising a sulfonic acid ester,
wherein the sulfonic acid ester comprises equal to or greater than 5.0 parts by mass of a sulfonic acid group with respect to 100 parts by mass in total mass of the magnesium hydroxide particles.

5. The battery according to claim 1,
wherein the first insulating layer further comprises aromatic polyamide.

* * * * *